(12) United States Patent
Tao

(10) Patent No.: US 9,584,851 B2
(45) Date of Patent: Feb. 28, 2017

(54) SOCIAL TELEVISION STATE SYNCHRONIZATION METHOD, SYSTEM AND TERMINAL

(71) Applicant: ZTE Corporation, Shenzhen, Guangdong (CN)

(72) Inventor: Weicheng Tao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/416,349

(22) PCT Filed: Dec. 31, 2012

(86) PCT No.: PCT/CN2012/088026
§ 371 (c)(1),
(2) Date: Jan. 22, 2015

(87) PCT Pub. No.: WO2013/166850
PCT Pub. Date: Nov. 14, 2013

(65) Prior Publication Data
US 2015/0208116 A1  Jul. 23, 2015

(30) Foreign Application Priority Data

Aug. 29, 2012  (CN) .......................... 2012 1 0312761

(51) Int. Cl.
H04N 21/43  (2011.01)
H04N 21/462  (2011.01)
(Continued)

(52) U.S. Cl.
CPC ......... H04N 21/4307 (2013.01); G06Q 50/01 (2013.01); H04L 67/1095 (2013.01);
(Continued)

(58) Field of Classification Search
CPC ....... H04N 21/44222; H04N 21/44218; H04N 21/25; H04N 21/4307; H04N 21/44204;
(Continued)

(56) References Cited

U.S. PATENT DOCUMENTS

2007/0198738 A1    8/2007  Angiolillo
2009/0089824 A1*   4/2009  Beyabani ............... H04H 60/80
                                                            725/17
(Continued)

FOREIGN PATENT DOCUMENTS

CN    101594519 A    12/2009
CN    101860446 A    10/2010
(Continued)

OTHER PUBLICATIONS

International Search Report in international application No. PCT/CN2012/088026, mailed on May 23, 2013.
(Continued)

Primary Examiner — Benjamin R Bruckart
Assistant Examiner — Akshay Doshi
(74) Attorney, Agent, or Firm — Oppedahl Patent Law Firm LLC

(57) ABSTRACT

Disclosed are a social television state synchronization system and method, comprising: a first social television client being set to send a subscription request message to a second social television client; the subscription request message carrying a social television state subscribed by the first social television client; the second social television client being set to, when one or more items in the corresponding subscribed social television state are changed, send a state change notification message to the first social television client according to configuration of the second social television client or according to a service or content provider policy; the first social television client being further set to,
(Continued)

according to configuration of the first social television client and the changed social television state carried by the state change notification message, synchronize a current social television state of the first social television client with the changed social television state of the second social television client. By means of the present invention, an objective that users watch a program synchronously and perform social interaction is implemented.

14 Claims, 3 Drawing Sheets

(51) Int. Cl.

| | | |
|---|---|---|
| *H04N 21/242* | (2011.01) | |
| *H04N 21/239* | (2011.01) | |
| *H04N 21/63* | (2011.01) | |
| *H04N 21/472* | (2011.01) | |
| *H04N 21/258* | (2011.01) | |
| *H04N 21/422* | (2011.01) | |
| *H04N 21/442* | (2011.01) | |
| *H04N 21/45* | (2011.01) | |
| *H04N 21/466* | (2011.01) | |
| *H04N 21/41* | (2011.01) | |
| *G06Q 50/00* | (2012.01) | |
| *H04N 21/254* | (2011.01) | |
| *H04N 21/2668* | (2011.01) | |
| *H04N 21/4788* | (2011.01) | |
| *H04L 29/08* | (2006.01) | |
| *H04W 4/20* | (2009.01) | |

(52) U.S. Cl.
CPC ......... *H04L 67/24* (2013.01); *H04N 21/2393* (2013.01); *H04N 21/242* (2013.01); *H04N 21/2541* (2013.01); *H04N 21/25816* (2013.01); *H04N 21/2668* (2013.01); *H04N 21/4104* (2013.01); *H04N 21/44204* (2013.01); *H04N 21/4532* (2013.01); *H04N 21/4622* (2013.01); *H04N 21/4667* (2013.01); *H04N 21/472* (2013.01); *H04N 21/4788* (2013.01); *H04N 21/632* (2013.01); *H04W 4/203* (2013.01)

(58) Field of Classification Search
CPC .......... H04N 21/4532; H04N 21/4667; H04N 21/4622; H04N 21/4104; H04N 21/242; H04N 21/2541; H04N 21/2393; H04N 21/632; H04N 21/2668; H04N 21/472; H04W 4/203; H04L 67/1095; H04L 67/24; G06Q 50/01
See application file for complete search history.

(56) References Cited

U.S. PATENT DOCUMENTS

| | | | |
|---|---|---|---|
| 2009/0100134 A1 | 4/2009 | Svennarp | |
| 2009/0300502 A1 | 12/2009 | Johnson | |
| 2010/0306655 A1 | 12/2010 | Mattingly | |
| 2010/0306671 A1 | 12/2010 | Mattingly | |
| 2011/0173672 A1 | 7/2011 | Angiolillo | |
| 2013/0251329 A1* | 9/2013 | McCoy | ................ H04N 21/654 386/201 |
| 2014/0173462 A1 | 6/2014 | Mattingly et al. | |

FOREIGN PATENT DOCUMENTS

| | | |
|---|---|---|
| CN | 101897167 A | 11/2010 |
| WO | 2012077984 A2 | 6/2012 |

OTHER PUBLICATIONS

English Translation of the Written Opinion of the International Search Authority in international application No. PCT/CN2012/088026, mailed on May 23, 2013.
Supplementary European Search Report in European application No. 12876145.9, mailed on Oct. 9, 2015.

* cited by examiner

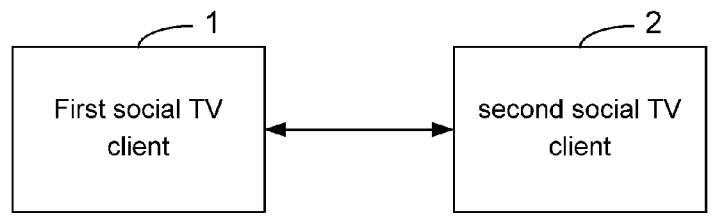
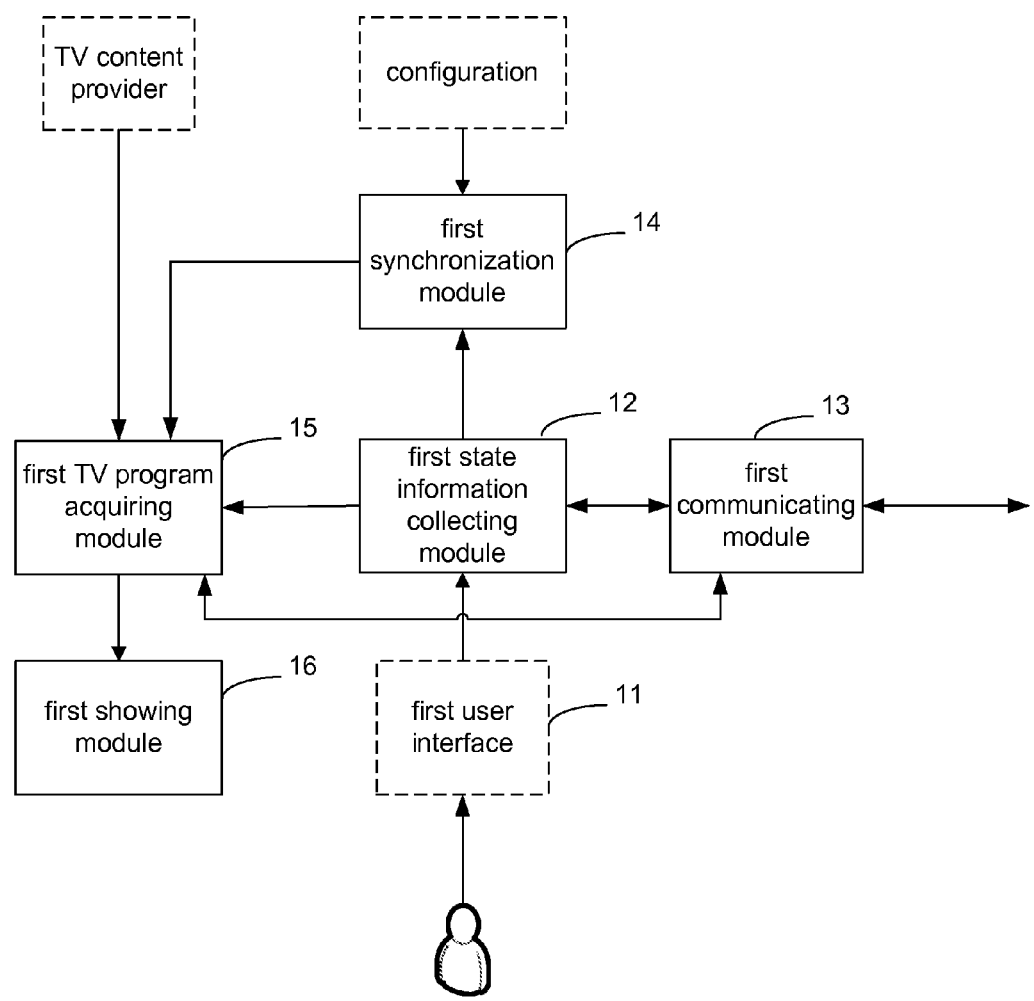

SOCIAL TELEVISION STATE SYNCHRONIZATION METHOD, SYSTEM AND TERMINAL

TECHNICAL FIELD

The disclosure relates to social TV technology, in particular to a method and system for social TV state synchronization, and a terminal.

BACKGROUND

Watching TV has always been a major way for information acquisition and entertainment. With the advent of a social network, people eager to socialize while watching TV. However, at present, a social application and TV are two independent functional modules. To post information to a social networking site to share the information with someone else, a user has to connect to and log into the social networking site via a device such as a computer or a mobile terminal, and then input the information to be share; or connects to the social networking site by clicking a share button using a computer or a mobile terminal. In other words, content that can be shared by a user is mostly user-input text, website information, and/or a file in a device such as a computer or a mobile terminal. There is no existing solution for implementing social interaction while watching TV by automatically learning, in watching TV, state information such as information on a TV program watched, as well as an operation performed, by a friend.

SUMMARY

In view of this, it is desired that embodiments of the disclosure provide a method and system for social TV state synchronization and a terminal, capable of implementing synchronous program watching and social interaction between two users.

To this end, a technical solution of an embodiment of the disclosure is implemented as follows.

According to an embodiment of the disclosure, a system for social television (TV) state synchronization includes a first social TV client and a second social TV client.

The first social TV client is configured for sending the second social TV client a subscription request including information on a social TV state to which the first social TV client is to subscribe.

The second social TV client is configured for sending, when there is a change in a local social TV state corresponding to the social TV state to which the first social TV client subscribes, the first social TV client a state change notification including a changed social TV state of the second social TV client according to a strategy of a service or content provider or according to a local configuration.

The first social TV client is further configured for performing, according to a local configuration, social TV state synchronization with the second social TV client by modifying a local social TV state to the changed social TV state.

The first social TV client may include a first user interface, a first state information collecting module and a first communicating module.

The first user interface may be configured for receiving a user operation of a first user, and informing the first state information collecting module of the user operation of the first user.

The first state information collecting module may be configured for: learning, from the first user interface, the user operation of the first user; and when the user operation of the first user is to subscribe to a social TV state, generating the subscription request to subscribe to the social TV state, and sending the generated subscription request to the first communicating module.

The first communicating module may be configured for sending the subscription request to the second social TV client.

The second social TV client may include a second user interface, a second state information collecting module and a second communicating module.

The second user interface may be configured for receiving a user operation of a second user, and informing the second state information collecting module of the user operation of the second user.

The second state information collecting module may be configured for: learning, from the second user interface, the user operation of the second user; and when the user operation of the second user causes a change in a local social TV state corresponding to a social TV state to which the first user subscribes, generating the state change notification, and sending the generated state change notification to the second communicating module.

The second communicating module may be configured for sending the state change notification to the first social TV client to notify the first social TV client of the change in the local social TV state, and receiving the subscription request sent by the first social TV client.

The second social TV client may further include a second TV program acquiring module and a second showing module.

The second TV program acquiring module may be configured for acquiring, when learning of the change in the local social TV state from the second state information collecting module, a TV program and program information corresponding to the changed social TV state from the service or content provider.

The second showing module may be configured for showing the TV program acquired by the second TV program acquiring module.

The first communicating module may be further configured for receiving the state change notification sent by the second social TV client, and forwarding the state change notification to the first state information collecting module.

The first state information collecting module may be further configured for learning, from the state change notification, the change in the social TV state of the second social TV client and the changed social TV state.

The first social TV client further may include a first synchronization module, a first TV program acquiring module and a first showing module.

The first synchronization module may be configured for extracting the state change notification from the first state information collecting module, and implementing, according to the configuration of the first social TV client and the changed social TV state included in the state change notification, social TV state synchronization with the second social TV client by controlling the first TV program acquiring module to acquire a TV program and program information corresponding to the changed social TV state from the service or content provider and/or the second social TV client.

The first TV program acquiring module may be configured for acquiring, under the control of the first synchronization module, the TV program and program information corresponding to the changed social TV state from the service or content provider and/or the second social TV client.

The first showing module may be configured for showing the TV program acquired by the first TV program acquiring module and information on the change in the social TV state of the second social TV client.

The first TV program acquiring module may be further configured for sending a TV content request to the second social TV client via the first communicating module.

The second TV program acquiring module may be further configured for receiving the TV content request via the second communicating module, and sending, according to the received TV content request, the TV program and program information corresponding to the changed social TV state to the first social TV client via the second communicating module.

The first TV program acquiring module may be further configured for receiving, via the first communicating module, the TV program and program information corresponding to the changed social TV state sent by the second social TV client.

The first TV program acquiring module may be further configured for reading the state change notification from the first state information collecting module, and acquiring the TV program and program information corresponding to the changed social TV state from the state change notification.

The second state information collecting module may be further configured for, in generating the state change notification, acquiring the TV program and program information corresponding to the changed social TV state from the second TV program acquiring module, and including the acquired TV program and program information in the state change notification.

A changed social TV state may include at least one of a TV channel, a TV program identifier, a TV content segment, a TV time shift, and a TV screenshot.

A social TV state for subscription may include at least one of a channel switching, a TV viewing angle switching, a TV time shifting, and a TV display mode switching.

According to an embodiment of the disclosure, a method for social television (TV) state synchronization includes:

sending, by a first social TV client, a second social TV client a subscription request including information on a social TV state to which the first social TV client is to subscribe;

when there is a change in a local social TV state corresponding to the social TV state to which the first social TV client subscribes, sending, by the second social TV client, the first social TV client a state change notification including a changed social TV state of the second social TV client according to a strategy of a service or content provider or according to a local configuration; and performing, by the first social TV client, social TV state synchronization with the second social TV client according to a local configuration by modifying a local social TV state to the changed social TV state.

The sending, by a first social TV client, a second social TV client a subscription request may include:

receiving, by the first social TV client, a user operation of a first user; and when the user operation of the first user is to initiate a subscription request to subscribe to a social TV state, generating the subscription request to subscribe to the social TV state, and sending the subscription request to the second social TV client.

The method may further include: after receiving the subscription request, returning, by the second social TV client, a subscription response to the first social TV client.

When there is a change in a local social TV state corresponding to the social TV state to which the first social TV client subscribes, the sending, by the second social TV client, the first social TV client a state change notification including a changed social TV state of the second social TV client may include:

receiving, by the second social TV client, a user operation of a second user; when the user operation of the second user causes a change in a local social TV state corresponding to a social TV state to which the first user subscribes, generating the state change notification; and sending the state change notification to the first social TV client to notify the first social TV client of the change in the local social TV state.

The method may further include:

when there is a change in the local social TV state, acquiring, by the second social TV client, a TV program and program information corresponding to the changed social TV state from the service or content provider; and showing the acquired TV program.

The performing, by the first social TV client, social TV state synchronization with the second social TV client according to a local configuration by modifying a local social TV state to the changed social TV state may include:

implementing, by the first social TV client, social TV state synchronization with the second social TV client according to the configuration of the first social TV client and the changed social TV state included in the state change notification by acquiring a TV program and program information corresponding to the changed social TV state from the service or content provider and/or the second social TV client.

A social TV state may include TV content and/or a user operation.

The TV content may include at least one of a TV channel, a TV program identifier, a TV content segment, a TV time shift, and a TV screenshot.

The user operation may include at least one of a channel switching, a TV viewing angle switching, a TV time shifting, and a TV display mode switching.

According to an embodiment of the disclosure, a terminal includes a state information collecting module, a communicating module and a synchronization module.

The state information collecting module may be configured for generating a subscription request including information on a social TV state to which the terminal is to subscribe, and sending the generated subscription request to the communicating module.

The communicating module may be configured for sending the subscription request to an opposite terminal, receiving a state change notification returned by the opposite terminal, and sending the state change notification to the state information collecting module.

The state collecting module may be further configured for learning, from the state change notification, a change in a social TV state of the opposite terminal and the changed social TV state.

The synchronization module may be configured for extracting the state change notification from the state information collecting module, and performing, according to a configuration of the terminal, social TV state synchronization with the opposite terminal by modifying a local social TV state to the changed social TV state.

The terminal may further include a user interface configured for receiving a user operation, and informing the state information collecting module of the user operation.

The state information collecting module may be further configured for learning the user operation from the user interface, and when the user operation is to subscribe to a social TV state, generating the subscription request to subscribe to the social TV state.

The terminal may further include a TV program acquiring module and a showing module.

The synchronization module may be configured for implementing social TV state synchronization with the opposite terminal by modifying a local social TV state to the changed social TV state by controlling the TV program acquiring module to acquire a TV program and program information corresponding to the changed social TV state from the service or content provider and/or the opposite terminal.

The TV program acquiring module may be configured for acquiring, under the control of the synchronization module, the TV program and program information corresponding to the changed social TV state from the service or content provider.

The showing module may be configured for showing the TV program acquired by the TV program acquiring module and information on the change in the social TV state of the opposite terminal.

The TV program acquiring module may be further configured for sending a TV content request to the opposite terminal via the communicating module, and receiving, via the communicating module, the TV program and program information corresponding to the changed social TV state sent by the opposite terminal.

Or, the TV program acquiring module may be further configured for reading the state change notification from the state information collecting module, and acquiring the TV program and program information corresponding to the changed social TV state from the state change notification.

According to an embodiment of the disclosure, a terminal includes a communicating module and a state information collecting module.

The communicating module is configured for receiving, from an opposite terminal, a subscription request including information on a social TV state to which the opposite terminal is to subscribe, and sending the subscription request to the state information collecting module.

The state information collecting module is configured for sending, when there is a change in a local social TV state corresponding to the social TV state to which the opposite terminal subscribes, the communicating module a state change notification including a changed social TV state of the terminal according to a strategy of a service or content provider or according to a configuration of the terminal.

The communicating module is further configured for sending the state change notification to the opposite terminal, such that the opposite terminal performs social TV state synchronization with the terminal by modifying a social TV state of the opposite terminal to the changed social TV state.

The terminal may further include a user interface configured for receiving a user operation and informing the state information collecting module of the user operation.

The state information collecting module may be further configured for learning, from the user interface, the user operation, and when the user operation causes a change in a local social TV state corresponding to the social TV state to which the opposite terminal subscribes, generating the state change notification.

The terminal may further include a TV program acquiring module and a showing module.

The TV program acquiring module may be configured for acquiring, when learning of the change in the local social TV state from the state information collecting module, a TV program and program information corresponding to the changed social TV state from the service or content provider.

The showing module may be configured for showing the TV program acquired by the TV program acquiring module.

The TV program acquiring module may be further configured for, when receiving a TV content request sent by the opposite terminal, sending, according to the received TV content request, the TV program and program information corresponding to the changed social TV state to the opposite terminal via the communicating module.

Or, the state information collecting module may be further configured for, in generating the state change notification, acquiring the TV program and program information corresponding to the changed social TV state from the TV program acquiring module, and including the acquired TV program and program information in the state change notification.

With a method and system for social TV state synchronization according to embodiments of the disclosure, a first social TV client generates, according to a received subscription request of a first user, a subscription request including information on a social TV state to which the first user is to subscribe and sends the subscription request to a second social TV client; the second social TV client informs the first social TV client through a state change notification when there is a change in one or more local social TV state corresponding to a social TV state under subscription; the first social TV client performs, according to a local configuration, social TV state synchronization with the second social TV client by modifying a local social TV state to a changed social TV state included in the state change notification. Thus, a user may interact with a friend while watching TV, and watch a program a friend is watching.

BRIEF DESCRIPTION OF THE DRAWINGS

FIG. 1 is a diagram of a structure of a system for social TV state synchronization according to an embodiment of the disclosure;

FIG. 2 is a diagram of a structure of a first social TV client in a system for social TV state synchronization according to an embodiment of the disclosure;

DETAILED DESCRIPTION

FIG. 1 shows a system architecture of a system for social TV state synchronization according to an embodiment of the disclosure, including a first social TV client 1 and a second social TV client 2.

The first social TV client 1 sends the second social TV client 2 a subscription request. The subscription request may include information on a social TV state to which the first social TV client 1 is to subscribe.

When there is a change in one or more states corresponding to the social TV state to which the first social TV client subscribes, the second social TV client 2 sends the first social TV client 1 a state change notification according to a strategy of a service or content provider or according to a configuration of the second social TV client.

For example, according to the local configuration, for privacy or for some other reasons, the second social TV client 2 may want to keep the first social TV client 1 from knowing a state change per se; or keep the first social TV client 1 from knowing a state change per se during a certain period of time, and allow the first social TV client 1 to know a state change per se beyond this period of time.

The strategy of the TV content provider may refer to a strategy of the TV content provider for acquiring TV content by a client, such as a TV copyright strategy, a payment strategy, etc. For example, a TV content provider will not allow a non-subscriber user to acquire content of a subscription-based TV program the second social TV client 2 pays to watch. The second social TV client 2 asks the TV content provider if the first social TV client 1 is authorized to acquire the TV program. When the first social TV client 1 is authorized to acquire the TV program the second social TV client 2 watches, a notification sent by the second social TV client 2 to the first social TV client 1 may contain state information such as program information. Otherwise when the first social TV client 1 is not authorized to acquire the TV program the second social TV client 2 watches, the second social TV client 2 informs the first social TV client 1 that the first social TV client is not authorized to simultaneously watch the TV program the second social TV client 2 is watching.

The first social TV client 1 performs, according to a configuration of the first social TV client and a changed social TV state included in the state change notification sent by the second social TV client 2, social TV state synchronization with the second social TV client 2 by modifying a current social TV state of the first social TV client to the changed social TV state of the second social TV client 2.

Figure 3:
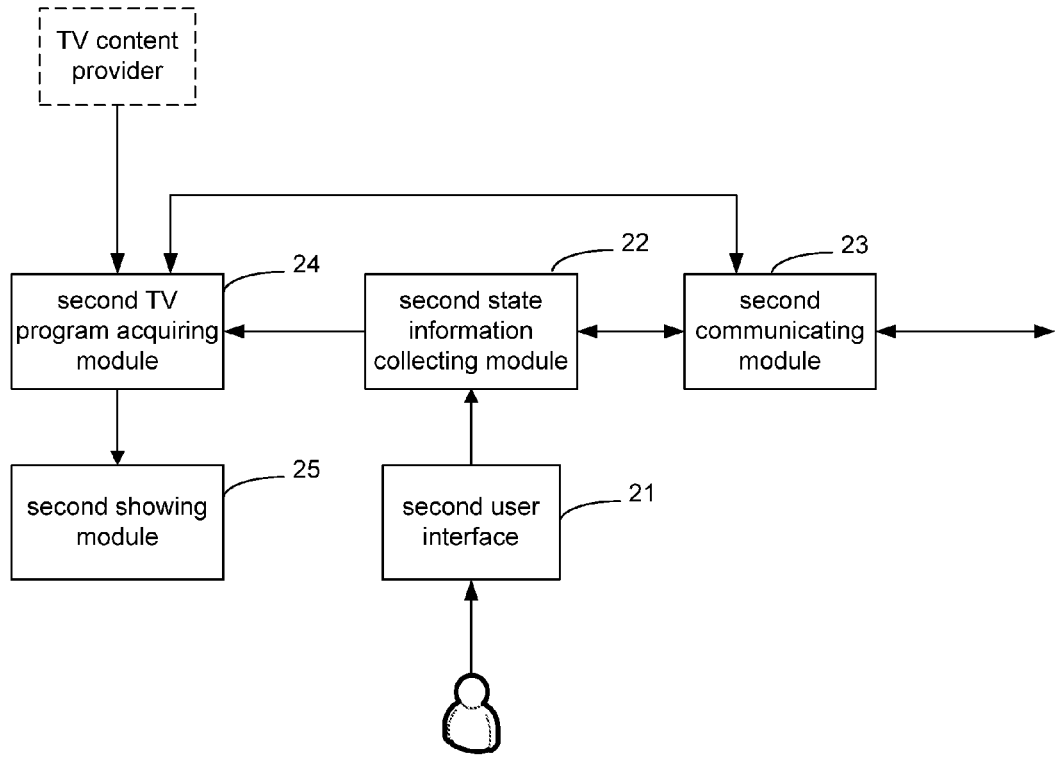
FIG. 3 is a diagram of a structure of a second social TV client in a system for social TV state synchronization according to an embodiment of the disclosure.

FIG. 2 is a diagram of a structure of the first social TV client. FIG. 3 is a diagram of a structure of the second social TV client.

The first social TV client, as shown in FIG. 2, may include a first user interface 11, a first state information collecting module 12, a first communicating module 13, a first synchronization module 14, a first TV program acquiring module 15 and a first showing module 16.

The first user interface 11 may receive a user operation of a first user, and inform the first state information collecting module 12 of the user operation of the first user.

The first state information collecting module 12 may learn, from the first user interface 11, the user operation of the first user; and when the user operation of the first user is to subscribe to a social TV state, generate the subscription request to subscribe to the social TV state, and send the generated subscription request to the first communicating module.

The first communicating module 13 may send the subscription request to the second social TV client 2.

The first communicating module 13 may receive the state change notification sent by the second social TV client 2, and forward the state change notification to the first state information collecting module 12.

The first state information collecting module 12 may learn, from the state change notification, the change in the social TV state of the second social TV client and the changed social TV state.

The first synchronization module 14 may extract the state change notification from the first state information collecting module 12, and implement, according to the configuration of the first social TV client and the state change notification, social TV state synchronization with the second social TV client by controlling the first TV program acquiring module 15 to acquire a TV program and program information corresponding to the changed social TV state from the service or content provider and/or the second social TV client 2.

The first TV program acquiring module 15 may acquire, under the control of the first synchronization module 14, the TV program and program information corresponding to the changed social TV state from the service or content provider and/or the second social TV client 2.

The first showing module 16 may show the TV program acquired by the first TV program acquiring module 15 and information on the change in the social TV state of the second social TV client 2.

The first TV program acquiring module 15 may acquire the TV program and program information corresponding to the changed social TV state from the second social TV client 2 as follows.

The first TV program acquiring module 15 may send a TV content request to the second social TV client 2 via the first communicating module 13. The second TV program acquiring module 24 may receive the TV content request via the second communicating module 23, and send, according to the received TV content request, the TV program and program information corresponding to the changed social TV state to the first social TV client 1 via the second communicating module 23. The first TV program acquiring module 15 may receive, via the first communicating module 13, the TV program and program information corresponding to the changed social TV state sent by the second social TV client 2.

Alternatively, the first TV program acquiring module 15 may read the state change notification from the first state information collecting module 12, and acquire the TV program and program information corresponding to the changed social TV state from the state change notification. In generating the state change notification, the second state information collecting module 22 may acquire the TV program and program information corresponding to the changed social TV state from the second TV program acquiring module 24, and include the acquired TV program and program information in the state change notification.

The second social client, as shown in FIG. 3, may include a second user interface 21, a second state information collecting module 22, a second communicating module 23, a second TV program acquiring module 24 and a second showing module 25.

The second user interface 21 may receive a user operation of a second user, and inform the second state information collecting module 22 of the user operation of the second user.

The second state information collecting module 22 may learn, from the second user interface 21, the user operation of the second user; and when the user operation of the second user causes a change in a local social TV state (i.e. a social TV state of the second social TV client 2) corresponding to a social TV state to which the first user subscribes, generate the state change notification, and send the generated state change notification to the second communicating module 23. The state change notification message may include the changed social TV state.

Note that the second state information collecting module 22 may generate the state change notification and send the state change notification to the second communicating module 23, which may send the state change notification to the first social TV client 1 to notify the first social TV client of the change of the social TV state only if: the second communicating module 23 receives the subscription request sent by the first social TV client 1, and sends the subscription request to the second state information collecting module 22.

When learning of the change in the social TV state from the second state information collecting module 22, the second TV program acquiring module 24 may acquire a TV program and program information corresponding to the changed social TV state from the service or content provider.

The second showing module 25 may show the TV program acquired by the second TV program acquiring module 24.

Social TV state synchronization may be completed through collaboration of aforementioned modules. In addition, the configuration of a client may be stored in a dedicated storing module I. A social network state under subscription may be stored in a dedicated storing module II. The storing module I and the storing module II may be located at the client or at a server.

Herein, the configuration of a client may include:

1. automatic state synchronization with a friend (for example, when it is learned that a friend is watching a sports channel, automatic synchronization is performed to switch to the sports channel the friend is watching);

2. non-automatic state synchronization with a friend, including when to start synchronization and when to stop synchronization;

3. selective state synchronization with a friend (for example synchronization is performed only for a TV channel, a program, a mode or a viewing angle as selected);

4. receiving no information on a change in a state of a friend;

5. receiving information on a change in a state of a friend in a do-not-disturb mode; and 6. receiving information on a change in a state of a friend in a pop-up or prompting mode.

An aforementioned technical solution of the disclosure will be illustrated below with specific embodiments.

Embodiment 1

According to the Embodiment, both user A and user B, who are friends to each other, are watching TV at their own homes, respectively. In order to discuss TV content they are watching on their own social TV clients, the user A may subscribe to a social TV state of the user B, in which case the social TV client of the user A is the first social TV client 1. The subscription process may include steps as follows.

I. A user A starts a local social TV client, selects a user B from a friend list through a first user interface 11, sets a social TV state for subscription, and then initiates a subscription request with the user B. A first state information collecting module 12 acquires information on an operation of the user A from the first user interface 11, and generates the subscription request including the set social TV state for subscription.

A social TV state for subscription may include at least one of a channel switching, a TV viewing angle switching, a TV time shifting, and a TV display mode switching.

The changed social TV state may include at least one of a TV channel, a TV program identifier, a TV content segment, a TV time shift, and a TV screenshot.

Figure 4:
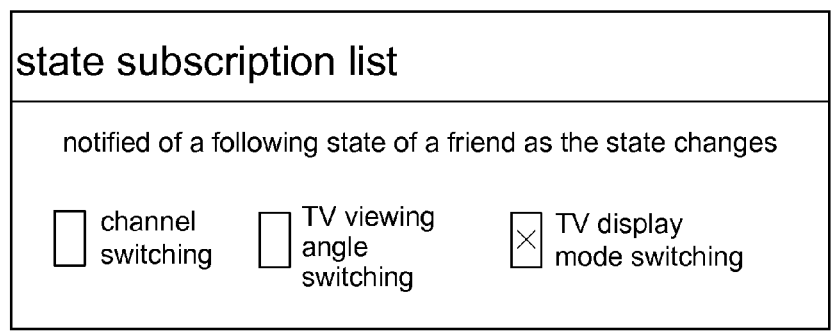
FIG. 4 is a schematic diagram of a social TV state for subscription according to an embodiment of the disclosure.

When the user A sets a social TV state for subscription, a system may provide a state subscription list. The state subscription list may contain one or more options, namely various states aforementioned. The user A may select to mark one or more options from the state subscription list. A marked option is a social TV state under subscription. When there is a change in a social TV state under subscription at the social TV client of the user B, the social TV client of the user B will send a state change notification to the user A. As shown in FIG. 4, a system-provided state subscription list may contain three options, namely channel switching, TV viewing angle switching and TV display mode switching. The user A may mark the "TV display mode switching" as a social TV state the user A subscribes to. Then, when there is a TV display mode switching operation at the social TV client of the user B, the social TV client of the user B will send a state change notification to the user A.

Alternatively, the user A may set no social TV state for subscription. Then a social TV state for subscription included in a subscription request may be system default. For example, "TV display mode switching" marked in FIG. 3 may also be system default.

II. The first state information collecting module 12 may provide the subscription request to a first communicating module 13. The first communicating module 13 may send the subscription request to the social TV client of the user B. The social TV client of the user B may receive the subscription request through a second communicating module 23, and then return a subscription response to the user A. If the subscription response indicates that the social TV state is available for subscription, the subscription is successful, otherwise the subscription fails.

Embodiment 2

Under the scene of Embodiment 1, after a user A successfully subscribe to a social TV state of a user B, social TV state synchronization may be carried out as follows. When there is a change in a state of the user B corresponding to the social TV state user A subscribes to (for example there is a TV viewing angle switching operation), the user B may send a state change notification to the user A. Synchronization with the user B may then be performed on the social TV client of user A, specifically as follows.

I. The user B switches, via a second user interface 21, the TV viewing angle from a viewing angle 1 to a viewing angle 2, from a sportsman 1 to a sportsman 2 in a football match, for example. The second user interface 21 may send information on the switching operation to a second state information collecting module 22.

II. After the TV viewing angle switching, the second state information collecting module 22 may learn that there is a change in the (TV viewing angle) state after acquiring information on the switching operation from the second user interface 21. A second TV program acquiring module 24 may then acquire a TV program and program information corresponding to the new viewing angle (viewing angle 2) from a service or content provider (in which case a second showing module 25 may show the TV program acquired by the second TV program acquiring module 24). Meanwhile, the second state information collecting module 22 may generate a state change notification and send the state change notification to the social TV client of the user A via the second communicating module 23, notifying the user A of the state change, and send the social TV state corresponding to the new viewing angle to the social TV client of the user A.

III. A first showing module 16 of the user A may display, before user A, the change in the social TV state of the user B. For example, on the upper part or in the lower right corner of a display of the social TV client of the user A, a message of "your friend B has switched to the viewing angle 2", as well as a TV screenshot in the viewing angle 2, may be shown, which may be displayed according to the configuration of the user A.

IV. A first synchronization module 14 of the user A may extract the social TV state corresponding to the new viewing angle from the state change notification according to the configuration of the user A.

V. Based on the configuration by the user A (assuming that in the embodiment, the user A sets automatic state synchronization with the user B), the first synchronization module 14 may control a first TV program acquiring module 15 to acquire a TV program and program information according to the social TV state corresponding to the new viewing angle. The acquired TV program and program information may then be shown to the user A via the first showing module 16, so that synchronization is completed.

Embodiment 3

According to the embodiment, both user A and user B, who are friends to each other, are watching TV at their own homes, respectively. User A may subscribe to a social TV state of the user B. At a certain moment, the user B switches to a TV program the user B has subscribed to and paid for. The user A however does not pay for the TV program. A synchronization process may be as follows.

I. A user A has subscribed to a social TV state of a user B, as described in Embodiment 1, which is not repeated.

II. After user A subscribes to the social TV state of user B successfully, the user B switches from a program 1 to a program 2 via a second user interface 21. The second user interface 21 may provide information on the switching operation to a second state information collecting module 22.

When the program 2 is a subscription-based program a user has to pay for, the social TV client of the user B has to ask a service or content provider if the user A has paid for the program.

III. A content provider may return information on whether the user A has paid for the program 2. When the user A has paid, a subsequent synchronization process is same as described in embodiment 2, and is not repeated. Otherwise when the user A has not paid for the program 2, the social TV client of the user B may return, to the social TV client of the user A, an error message that synchronization cannot be carried out, such as "This is a paid program. As you have not paid for it, I am not authorized to send information on the program to you".

Figure 5:
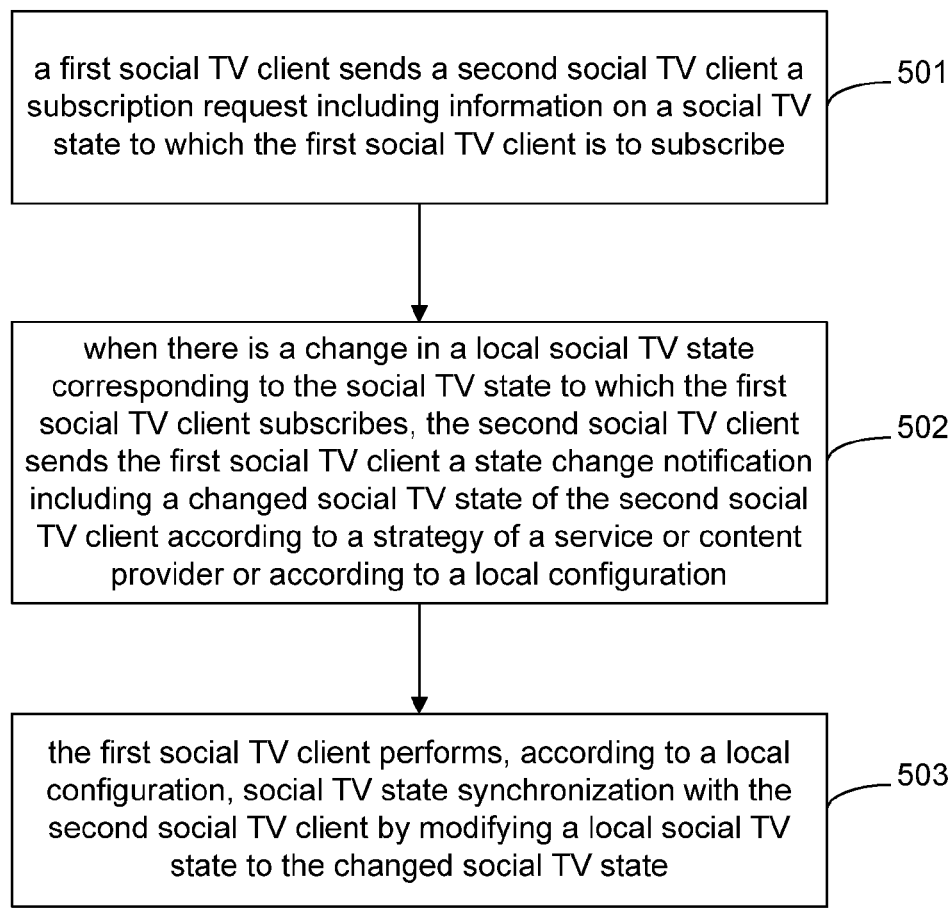
FIG. 5 is a flowchart of a method for social TV state synchronization according to an embodiment of the disclosure.

To sum up, a method for social TV state synchronization according to an embodiment of the disclosure, as shown in FIG. 5, may include steps as follows.

In Step 501, a first social TV client sends a second social TV client a subscription request including information on a social TV state to which the first social TV client is to subscribe.

The first social TV client may receive a user operation of a first user. When the user operation of the first user is to initiate a subscription request to subscribe to a social TV state, the first social TV client may generate the subscription request to subscribe to the social TV state, and send the subscription request to the second social TV client.

After receiving the subscription request, the second social TV client may return a subscription response to the first social TV client.

In Step 502, when there is a change in a local social TV state corresponding to a social TV state to which the first social TV client subscribes, the second social TV client sends the first social TV client a state change notification according to a strategy of a service or content provider or according to a local configuration.

The second social TV client may receive a user operation of a second user. When the user operation of the second user causes a change in a social TV state (of the second social TV client) which corresponds to a social TV state to which the first user subscribes, the second social TV client may generate a state change notification and send the state change notification to the first social TV client to notify the first social TV client of the change in the local social TV state. The state change notification may include a changed social TV state of the second social TV client.

In addition, when there is a change in the local social TV state, the second social TV client may acquire a TV program and program information corresponding to the changed social TV state from the service or content provider, and show the acquired TV program.

In Step 503, the first social TV client performs, according to a local configuration, social TV state synchronization with the second social TV client by modifying a local social TV state to a changed social TV state included in the state change notification.

The first social TV client may implement social TV state synchronization with the second social TV client according to the configuration of the first social TV client and the changed social TV state included in the state change notification by acquiring a TV program and program information corresponding to the changed social TV state from the service or content provider and/or the second social TV client.

Such a social TV state may include TV content and/or a user operation.

Such TV content may include at least one of a TV channel, a TV program identifier, a TV content segment, a TV time shift, and a TV screenshot.

Such a user operation may include at least one of a channel switching, a TV viewing angle switching, a TV time shifting, and a TV display mode switching.

To implement an aforementioned method and system, an embodiment of the disclosure provides a terminal, including an aforementioned first social TV client. The terminal may include a state information collecting module, a communicating module and a synchronization module.

The state information collecting module may be configured for generating a subscription request including information on a social TV state to which the terminal is to subscribe, and sending the generated subscription request to the communicating module.

The communicating module may be configured for sending the subscription request to an opposite terminal, receiving a state change notification returned by the opposite terminal, and sending the state change notification to the state information collecting module.

The state collecting module may be further configured for learning, from the state change notification, a change in a social TV state of the opposite terminal and the changed social TV state.

The synchronization module may be configured for extracting the state change notification from the state information collecting module, and performing, according to a configuration of the terminal, social TV state synchronization with the opposite terminal by modifying a local social TV state to the changed social TV state.

The terminal may further include a user interface configured for receiving a user operation, and informing the state information collecting module of the user operation.

The state information collecting module may be further configured for learning the user operation from the user interface, and when the user operation is to subscribe to a social TV state, generating the subscription request to subscribe to the social TV state.

The terminal may further include a TV program acquiring module and a showing module.

The synchronization module may be configured for extracting a state change notification from the state information collecting module, implementing social TV state synchronization with the opposite terminal according to the configuration of the terminal and the changed social TV state included in the state change notification, by modifying a local social TV state to the changed social TV state by controlling the TV program acquiring module to acquire a TV program and program information corresponding to the changed social TV state from the service or content provider and/or the opposite terminal.

The TV program acquiring module may be configured for acquiring, under the control of the synchronization module, the TV program and program information corresponding to the changed social TV state from the service or content provider and/or the opposite terminal.

The showing module may be configured for showing the TV program acquired by the TV program acquiring module and information on the change in the social TV state of the opposite terminal.

Alternatively, the TV program acquiring module may be further configured for sending a TV content request to the opposite terminal via the communicating module, and receiving, via the communicating module, the TV program and program information corresponding to the changed social TV state sent by the opposite terminal.

Alternatively, the TV program acquiring module may be further configured for reading the state change notification from the state information collecting module, and acquiring the TV program and program information corresponding to the changed social TV state from the state change notification.

An embodiment of the disclosure further provides a terminal including an aforementioned second social TV client. The terminal may include a communicating module and a state information collecting module.

The communicating module may be configured for receiving, from an opposite terminal, a subscription request including information on a social TV state to which the opposite terminal is to subscribe, and sending the subscription request to the state information collecting module.

The state information collecting module may be configured for sending, when there is a change in one or more local social TV states corresponding to a social TV state to which the opposite terminal subscribes, the communicating module a state change notification including a changed social TV state of the terminal according to a strategy of a service or content provider or according to a configuration of the terminal.

The communicating module may be further configured for sending the state change notification to the opposite terminal, such that the opposite terminal performs social TV state synchronization with the terminal by modifying a current social TV state of the opposite terminal to the changed social TV state of the terminal.

The terminal may further include a user interface configured for receiving a user operation and informing the state information collecting module of the user operation.

The state information collecting module may be further configured for learning, from the user interface, the user operation, and when the user operation causes a change in a local social TV state corresponding to a social TV state to which the opposite terminal subscribes, generating the state change notification including a changed social TV state.

The terminal may further include a TV program acquiring module and a showing module.

The TV program acquiring module may be configured for acquiring, when learning of the change in the local social TV state from the state information collecting module, a TV program and program information corresponding to the changed social TV state from the service or content provider.

The showing module may be configured for showing the TV program acquired by the TV program acquiring module.

The TV program acquiring module may be further configured for, when receiving a TV content request sent by the opposite terminal, sending, according to the received TV content request, the TV program and program information corresponding to the changed social TV state to the opposite terminal via the communicating module.

Alternatively, the state information collecting module may be further configured for, in generating the state change notification, acquiring the TV program and program information corresponding to the changed social TV state from the TV program acquiring module, and including the acquired TV program and program information in the state change notification.

What described are merely embodiments of the disclosure, and are not intended to limit the protection scope of the disclosure.

The invention claimed is:

1. A system for social television (TV) state synchronization, comprising a first social TV client and a second social TV client, wherein:
   the first social TV client comprises: a first processor; and a first memory comprising instructions executable by the first processor for sending the second social TV client a subscription request comprising information on a social TV state to which the first social TV client is to subscribe;
   the second social TV client comprises: a second processor; and a second memory comprising instructions executable by the second processor for sending, when there is a change in a social TV state of the second social TV client corresponding to the social TV state to which the first social TV client subscribes, the first social TV client a state change notification comprising a changed social TV state of the second social TV client according to a strategy of a service or content provider for acquiring TV content by a client and according to a configuration of the second social TV client, wherein the strategy comprises at least one of a TV copyright strategy and a payment strategy; and the first memory further comprises instructions executable by the first processor for performing, according to a configuration of the first social TV client, social TV state synchronization with the second social TV client by modifying a social TV state of the first social TV client to the changed social TV state of the second social TV client, wherein: the first memory comprises instructions executable by the first processor for: receiving information on a user operation of a first user; when the user operation of the first user is to subscribe to a social TV state, providing a list of social TV states for subscription, setting user selection of one or more social TV states from the list or a social TV state by system default as the social TV state to which the first social TV client is to subscribe, generating the subscription request, and sending the subscription request to the second social TV client, wherein: the second memory comprises instructions executable by the second processor for receiving the subscription request sent by the first social TV client; receiving information on a user operation of a second user; when it is determined that the user operation of the second user causes a change in a social TV state of the second social TV client, determining whether the changed social TV state corresponds to the social TV state to which the first social TV client subscribes, when the changed social TV state corresponds to the social TV state to which the first social TV client subscribes, generating the state change notification; and sending the state change notification to the first social TV client to notify the first social TV client of the change in the social TV state of the second social TV client.

2. The system according to claim 1, wherein: the second memory comprises instructions executable by the second processor for acquiring, when the user operation of the second user causes a change in the social TV state of the second social TV client, a TV program and program information corresponding to the changed social TV state from the service or content provider; and showing the acquired TV program.

3. The system according to claim 1, wherein:
the first memory comprises instructions executable by the first processor for receiving the state change notification sent by the second social TV client; learning, from the state change notification, the change in the social TV state of the second social TV client and the changed social TV state; implementing, according to the configuration of the first social TV client and the changed social TV state comprised in the state change notification, social TV state synchronization with the second social TV client by acquiring a TV program and program information corresponding to the changed social TV state from the service or content provider and/or the second social TV client; and showing the acquired TV program and information on the change in the social TV state of the second social TV client.

4. The system according to claim 1, wherein:
a changed social TV state comprises at least one of a TV channel, a TV program identifier, a TV content segment, a TV time shift, and a TV screenshot; and
a social TV state for subscription comprises at least one of a channel switching, a TV viewing angle switching, a TV time shifting, and a TV display mode switching.

5. The system according to claim 3, wherein:
the first memory comprises instructions executable by the first processor for sending a TV content request to the second social TV client;
the second memory comprises instructions executable by the second processor for receiving the TV content request, and sending, according to the received TV content request, the TV program and program information corresponding to the changed social TV state to the first social TV client; and
the first memory comprises instructions executable by the first processor for receiving the TV program and program information corresponding to the changed social TV state sent by the second social TV client.

6. The system according to claim 3, wherein:
the first memory comprises instructions executable by the first processor for acquiring the TV program and program information corresponding to the changed social TV state from the state change notification; and
the second memory comprises instructions executable by the second processor for, in generating the state change notification, comprising the TV program and program information in the state change notification.

7. A method for social television (TV) state synchronization, comprising:
sending, by a first social TV client, a second social TV client a subscription request comprising information on a social TV state to which the first social TV client is to subscribe;
when there is a change in a social TV state of the second social TV client corresponding to the social TV state to which the first social TV client subscribes, sending, by the second social TV client, the first social TV client a state change notification comprising a changed social TV state of the second social TV client according to a strategy of a service or content provider for acquiring TV content by a client and according to a configuration of the second social TV client, wherein the strategy comprises at least one of a TV copyright strategy and a payment strategy; and
performing, by the first social TV client, social TV state synchronization with the second social TV client according to a configuration of the first social TV client by modifying a social TV state of the first social TV client to the changed social TV state of the second social TV client, wherein: the sending, by a first social TV client, a second social TV client a subscription request comprises:
receiving, by the first social TV client, information on a user operation of a first user; when the user operation of the first user is to subscribe to a social TV state, providing a list of social TV states for subscription, setting user selection of one or more social TV states from the list or a social TV state by system default as the social TV state to which the first social TV client is to subscribe, generating the subscription request, and sending the subscription request to the second social TV client, wherein: the sending, by the second social TV client, the first social TV client a state change notification comprises:
receiving, by the second social TV client, information on a user operation of a second user; when it is determined that the user operation of the second user causes a change in a social TV state of the second social TV client, determining whether the changed social TV state corresponds to the social TV state to which the first social TV client subscribes, when the changed social TV state corresponds to the social TV state to which the first social TV client subscribes, generating the state change notification; and sending the state change notification to the first social TV client to notify the first social TV client of the change in the social TV state of the second social TV client.

8. The method according to claim 7, further comprising: when the user operation of the second user causes a change in the social TV state of the second social TV client, acquiring, by the second social TV client, a TV program and program information corresponding to the changed social TV state from the service or content provider; and showing the acquired TV program.

9. The method according to claim 7, wherein: the performing, by the first social TV client, social TV state synchronization with the second social TV client according to a configuration of the first social TV client by modifying a social TV state of the first social TV client to the changed social TV state of the second social TV client comprises:
  implementing, by the first social TV client, social TV state synchronization with the second social TV client according to the configuration of the first social TV client and the changed social TV state comprised in the state change notification by acquiring a TV program and program information corresponding to the changed social TV state from the service or content provider and/or the second social TV client.

10. The method according to claim 7, wherein: a social TV state comprises TV content and/or a user operation;
  the TV content comprises at least one of a TV channel, a TV program identifier, a TV content segment, a TV time shift, and a TV screenshot; and
  the user operation comprises at least one of a channel switching, a TV viewing angle switching, a TV time shifting, and a TV display mode switching.

11. A terminal, comprising: a processor; and a memory comprising instructions executable by the processor for:
  sending an opposite terminal a subscription request comprising information on a social TV state to which the terminal is to subscribe;
  when there is a change in a social TV state of the opposite terminal corresponding to the social TV state to which the terminal subscribes, receiving a state change notification comprising a changed social TV state of the opposite terminal sent by the opposite terminal according to a strategy of a service or content provider for acquiring TV content by a client and according to a configuration of the opposite terminal, wherein the strategy comprises at least one of a TV copyright strategy and a payment strategy; and
  performing social TV state synchronization with the opposite terminal according to a configuration of the terminal by modifying a social TV state of the terminal to the changed social TV state of the opposite terminal,
  wherein: the processor is configured for sending the opposite terminal the subscription request by:
  receiving information on a user operation of a user; when the user operation is to subscribe to a social TV state, providing a list of social TV states for subscription, setting user selection of one or more social TV states from the list or a social TV state by system default as the social TV state to which the terminal is to subscribe, generating the subscription request, and sending the subscription request to the opposite terminal,
  wherein: the opposite terminal sends the terminal the state change notification by:
  receiving information on a user operation of a second user; when it is determined that the user operation of the second user causes a change in a social TV state of the opposite terminal, determining whether the changed social TV state corresponds to the social TV state to which the terminal subscribes, when the changed social TV state corresponds to the social TV state to which the terminal subscribes, generating the state change notification; and sending the state change notification to the terminal to notify the terminal of the change in the social TV state of the opposite terminal.

12. The terminal according to claim 11, wherein: the memory comprises instructions executable by the processor for implementing, according to the configuration of the terminal and the changed social TV state comprised in the state change notification, social TV state synchronization with the opposite terminal by acquiring a TV program and program information corresponding to the changed social TV state from the service or content provider and/or the opposite terminal; and showing the acquired TV program and information on the change in the social TV state of the opposite terminal, wherein:
  the memory comprises instructions executable by the processor for sending a TV content request to the opposite terminal, and receiving the TV program and program information corresponding to the changed social TV state sent by the opposite terminal;
  or
  the memory comprises instructions executable by the processor for acquiring the TV program and program information corresponding to the changed social TV state from the state change notification.

13. A terminal, comprising: a processor; and a memory comprising instructions executable by the processor for:
  receiving, from an opposite terminal, a subscription request comprising information on a social TV state to which the opposite terminal is to subscribe;
  when there is a change in a social TV state of the terminal corresponding to the social TV state to which the opposite terminal subscribes, sending the opposite terminal a state change notification comprising a changed social TV state of the terminal according to a strategy of a service or content provider for acquiring TV content by a client and according to a configuration of the terminal, wherein the strategy comprises at least one of a TV copyright strategy and a payment strategy, such that the opposite terminal performs social TV state synchronization with the terminal according to a configuration of the opposite terminal by modifying a social TV state of the opposite terminal to the changed social TV state of the terminal,
  wherein: the opposite terminal sends the terminal the subscription request by:
  receiving information on a user operation of a first user; when the user operation of the first user is to subscribe to a social TV state, providing a list of social TV states for subscription, setting user selection of one or more social TV states from the list or a social TV state by system default as the social TV state to which the opposite terminal is to subscribe, generating the subscription request, and sending the subscription request to the terminal,
  wherein: the processor is configured for sending the opposite terminal the state change notification by:
  receiving information on a user operation of a second user; when it is determined that the user operation of the second user causes a change in a social TV state of the terminal, determining whether the changed social TV state corresponds to the social TV state to which the opposite terminal subscribes, when the changed social TV state corresponds to the social TV state to which the opposite terminal subscribes, generating the state change notification; and sending the state change notification to the opposite terminal to notify the opposite terminal of the change in the social TV state of the terminal.

14. The terminal according to claim 13, wherein: the memory comprises instructions executable by the processor for acquiring, when the user operation causes a change in the social TV state of the terminal, a TV program and program information corresponding to the changed social TV state from the service or content provider; and showing the acquired TV program, wherein:

the memory comprises instructions executable by the processor for, when receiving a TV content request sent by the opposite terminal, sending, according to the received TV content request, the TV program and program information corresponding to the changed social TV state to the opposite terminal;

or the memory comprises instructions executable by the processor for, in generating the state change notification, comprising the TV program and program information in the state change notification.

\* \* \* \* \*